Feb. 21, 1961 P. AUMANN 2,972,452
BRAKE SYSTEM FOR UNWINDERS
Filed June 12, 1957
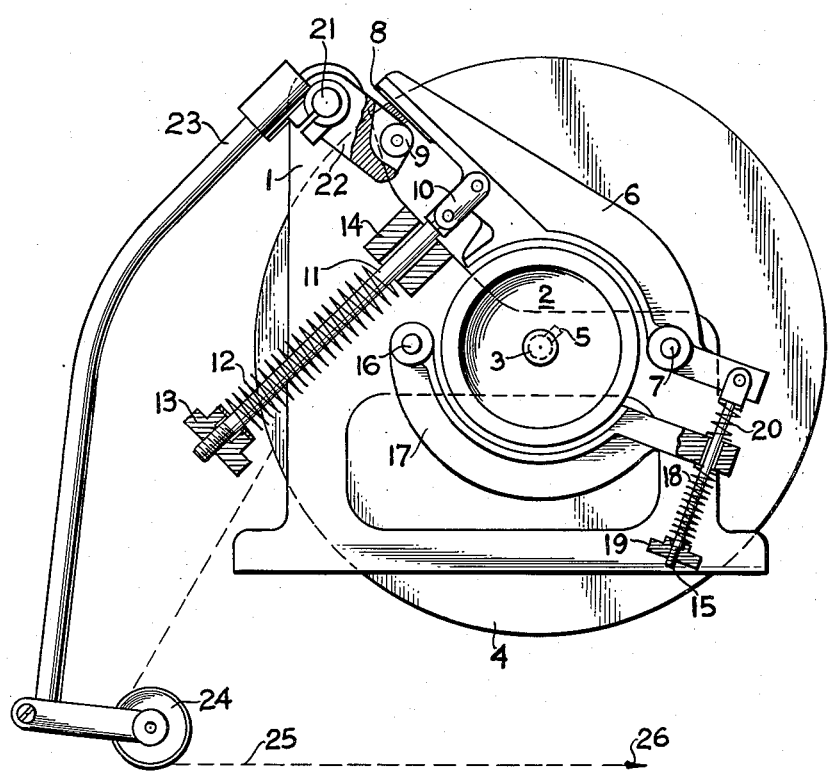
INVENTOR
PETER AUMANN
BY Toulmin & Toulmin
ATTORNEYS United States Patent Office 2,972,452
Patented Feb. 21, 1961

2,972,452
BRAKE SYSTEM FOR UNWINDERS
Peter Aumann, Lubbeckerstrasse 7, Lohne, Westphalia, Germany
Filed June 12, 1957, Ser. No. 665,244
1 Claim. (Cl. 242—75.43)

The present invention relates to a decoiling apparatus for threads, tapes, wires and similar coilable materials. More in particular, the present invention relates to a braking device for a decoiling apparatus of the nature referred to.

In the processing of wires or threads or similar coilable materials, the decoiling of this material must be carried out carefully and particular attention must be given to two essential requirements. First of all, the material must be unwound from the supply coil with a preferably constant pull even if the speed of operation varies. Secondly, the supply coil must be adapted to stop abruptly in case of an interruption or at the end of the decoiling operation, in order to prevent a continuation of the decoiling movement of the material.

A number of devices have been devised in the art with a view to cope with these problems. These devices usually consist of a shaft upon which the supply coil is mounted and a brake device coupled to the decoiling branch. That decoiling branch consists of a two armed lever borne by a horizontal axis and connected to a fulcrum via a tension or pressure spring. The other end of the lever bears a decoiling roll around which is guided the coilable material. In its resting position the decoiling shaft and, consequently, the supply roll are blocked by the tension of the springs transmitted via the decoiling branch and the coupling means to the brake means. Whenever the coilable material is wound off the supply roll and, via the decoiling roll wound around a core, the decoiling branch is displaced and the spring is tensioned, until the brake releases the supply coil. The brake remains in this position until the end of the acceleration of the coiling operation. As soon as the maximum number of revolutions has been reached, the pull acting upon the coilable material decreases, the decoiling branch is reset into its resting position by force of the tension spring and thus brakes the supply coil. As a consequence, the decoiling pull increases and the decoiling branch is thus moved into the opposite position, thereby again releasing the brake and so forth.

These devices have proved to be highly unsatisfactory, for the following reasons: the decoiling branch performs the functions of a spring balance and must adjust its respective position to the respective decoiling force prevailing at any particular moment. In other words the brake must be so adjusted, that for each position of the decoiling branch the required decoiling force is obtained. As a result the brake must operate extremely sensitively in order to prevent the decoiling branch from swinging back and forth and to diminish the resulting variations of the decoiling force. At the same time, however, the brake must be capable of abruptly halting the supply coil in case the coilable material breaks and it must also be able to stop very quickly the machine coil, upon which the coilable material pulled off the supply coil is wound. It is quite natural that one and the same brake system cannot perform the two contradictory functions of a very sensitive braking for producing an even and regular decoiling force on the one hand and on the other hand of a vigorous and abrupt braking of the supply coils. In case the brake is adapted to the first condition, i.e. the maintenance of an even and regular decoiling force during the coiling operation, it will be too weak in case of an interruption or at the end of the coiling operation and it will be incapable of bringing the supply coil to a timely hold. If, on the other hand, the braking system is adapted to adequately bring about a sudden stop of the supply roll, it is too cumbersome and inaccurate and lacks the necessary degree of sensitivity which is required for maintaining a constant or substantially constant decoiling force during the decoiling operation.

It is the general object of the present invention to provide a brake system for a coiling device for wires, threads, or similar coilable materials which assures a smooth and undisturbed operation and cessation of the de-coiling process.

It is the particular object of the present invention to provide a brake system for a coiling device for wires, threads, or similar coilable materials which combines the functions of maintaining the pull exerted upon the coilable material at a constant or substantially constant level, and bringing the movement of the decoilable material to a sudden halt when required.

These objects are achieved and the disadvantages of the known devices are avoided by the brake system of my invention. Since two entirely different braking functions are to be performed by the brake system, the device of my invention comprises two systems which, while being different and adapted to fully perform a particular function do cooperate and mutually supplement each other so as to accomplish a highly satisfactory functioning of the decoiling operation. According to my invention, the pull exerted upon the coilable material controls two brake blocks in such a manner that during the coiling operation one brake block is out of contact with the brake drum and only performs a braking function and brings the supply coil to an abrupt halt in case of an interruption or at the end of the decoiling operation. The other brake exercises a very sensitive and adaptive braking effect upon the supply coil thus maintaining an even and regular decoiling force during the decoiling operation.

The present invention will be better understood on the basis of the accompanying drawing which represents a partially sectional front view of the brake system according to the present invention.

The two brake systems of the present invention comprise brake blocks 6 and 17, respectively, each acting upon a common brake drum 2. The two brakes are carried by two support frames arranged parallel to each other and on both sides of the brakes. In the accompanying drawing only the support frame 1 arranged behind the brakes is shown, while the frame on the other side of the brakes, i.e. in front of the latter in terms of the drawing has been omitted for the sake of clarity. The brake drum 2 is borne by shaft 3, the latter being positioned in the support frames. The shaft 3 protrudes from the exterior side of support frame 1, opposite to that side of the frame facing the inner side of the second frame and the brakes. Upon the protruding portion of this shaft 3 there is slidably mounted the supply coil 4. It can thus easily be slid upon the protruding portion of shaft 3 and removed therefrom, as the case may require, for example, if the supply coil has to be restocked with the thread, tape, or wire material. The supply coil can be coupled to the shaft 3 by means of a wedge 5 which is mounted upon the protruding portion of the shaft.

The brake block or shoe 6 is constructed as a two-armed lever having branches of different length, and is fulcrumed around stud 7 which, in turn, is fastened to frame 1. At the free end of the longer one of the two branches of brake block 6 there is provided a straight runway 8 for the roll 9. The runway can also be curve-shaped. Furthermore, a bolt 11 is hingedly connected to brake block 6 via strap 10. The bolt 11 carries a spring 12, which is supported on its one end by the free end of nut 13 screwed upon the free end of bolt 11, and on its opposite end by shoulder portion 14 of frame 1. In consequence of this position, spring 12 draws brake block 6 towards the brake drum 2 until a mutual contact is obtained. On the other side of brake drum 2 opposite to brake block 6 there is a second brake block or shoe 17 fulcrumed around pivot stud 16 which is mounted in frame 1. At its free end brake block 17 is provided with a boring, through which bolt 15 is passed; on its upper end this bolt 15 is hingedly connected to the shorter branch of brake block 6, and on its lower end bolt 15 carries a plate spring 18.

This plate spring 18 rests with one end on nut 19 screwed upon bolt 15 and with its other end upon brake block 17. Bolt 15 also supports a pressure spring 20 bearing against brake block 6 and brake block 17. Furthermore, a shaft 21 is positioned in the frame 1 and the second frame (not shown) between the two frames. This shaft 21 bears the fork-shaped swivelling arm 22 which, in turn, carries roller 9. The shaft 21 protrudes beyond frame 1 in the same manner as does the shaft 3. At the other side of frame 1 and intermediate the two flanges of supply coil 4 the shaft 21 bears a lever 23 at the free end of which decoiling roll 24 is hingedly connected. The coilable material 25 is drawn off the supply coil 4 via the decoiling roll 24.

At the start of the decoiling operation the decoiling force attacking at the coilable material, e.g. wire 25 in the direction indicated by the arrow 26 displaces the lever 23 in the direction of that arrow. After a relatively short displacement of this lever which is communicated to the brake block 6 via the swivelling arm 22 and the roller 9 running across the runway 8, the brake block 6 is pushed out of contact with the brake drum 2, thereby simultaneously tensioning plate spring 12. The tension of that spring maintains the decoiling energy of the threads, wires or tapes while the latter are removed from the supply coil. During this operation only brake block 17 remains in contact with brake drum 2 due to the influence of spring 18 which is much stronger than spring 12. The decoiling roll 24, shaft 3 bearing the supply coil 4 and the brake drum 2, the fulcrums 10 and 21 in connection with the roller 9 and the runway 8 are so arranged relative to each other that the force of plate spring 12 acts upon the coilable material, as for instance wire 25 via lever 23 and decoiling roll 24 in such a manner that in each and any position of lever 23 this force remains constant or substantially constant. Consequently, the force of tension applied to the wire is constant or varies only within allowable limits; particularly, if the plate spring 12 is tensioned by the wire 25, an allowable increase of the force of tension within the latter results. A slight increase of thin force of tension immediately causes a motion of lever 23 and by this motion transmitted via the roller 9, the brake block 6 and bolt 15, the tension of plate spring 18 and hence the braking force of brake block 17 is somewhat decreased.

The brake block 17 remains in permanent contact with brake drum 2 and changes its braking force only to a very small degree whenever minor variations of the force of tension within the wire occur. Only in case of a marked acceleration of the coiling operation brake block 17 is removed from the brake drum 2 through pressure spring 20. On the other hand, brake block 6 performs a braking function only at the end of the coiling operation or whenever the wire or other coilable material breaks. The plate springs 12 and 18 can be easily adjusted even during the coiling operation by means of nuts 13 and 19 in order to obtain the desired force of tension for the decoiling process.

It will be understood that this invention is susceptible to modification in order to adapt it to different usages and conditions, and, accordingly, it is desired to comprehend such modifications within this invention as may fall within the scope of the appended claim.

What I claim is:

In an apparatus for decoiling coilable material, the combination of a frame, a shaft rotatably mounted on said frame and adapted to carry a supply roll, and a brake system comprising a brake drum carried by said shaft for rotation therewith, a first brake block associated with said drum and being in the form of a lever hingedly fastened upon said frame, a second brake block associated with said drum and being in the form of a two-armed lever having branches of uneven lengths, said second brake block being hingedly fastened upon said frame opposite said first brake block, means associated with both said first and second brake blocks for causing the former to hold the decoiling force applied to a supply coil carried by said shaft at a substantially constant level and for keeping the latter out of contact with said brake drum during the decoiling process and bringing said second brake block into firm braking contact with said brake drum whenever the decoiling process is interrupted, and first spring means and second spring means, said first spring means being positioned between the end of the shorter branch of said second brake block and the free end of said first brake block, said second spring means being mounted on the opposite side of the free end of said first brake block, said first spring means tending to push said first brake block away from said brake drum, said second spring means tending to push said first brake block against said brake drum, and said brake system further comprising a second shaft, a swivelling arm, a roller, a runway upon the free end of the longer branch of said second brake block, and a lever, said swivelling arm being hingedly mounted upon said second shaft, said roller being mounted upon said swivelling arm and being adapted to roll along said runway, said lever being hingedly mounted upon said second shaft at one end and carrying a decoiling roll at the other end.

References Cited in the file of this patent
UNITED STATES PATENTS

| | | |
|---|---|---|
| 1,077,375 | Sundh | Nov. 4, 1913 |
| 1,395,830 | Jones | Nov. 1, 1921 |
| 1,962,938 | Richter | June 12, 1938 |
| 2,869,684 | Tarbuck | Jan. 20, 1959 |